March 31, 1959     W. G. GORTON     2,879,737
DEPTH-CONTROLLING DEVICES FOR OBJECTS TOWED IN WATER
Filed Jan. 18, 1956     3 Sheets-Sheet 1
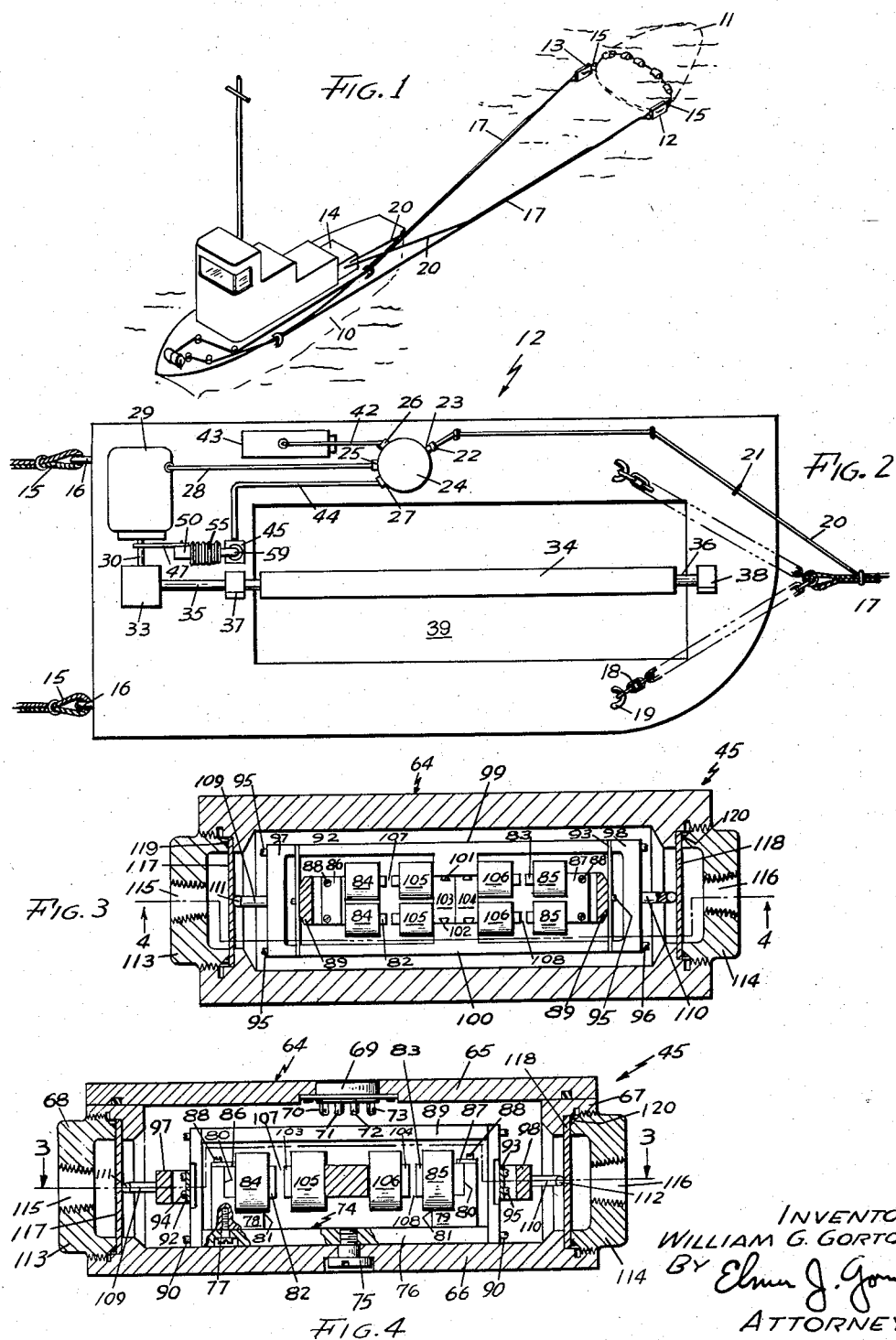
INVENTOR
WILLIAM G. GORTON
BY
ATTORNEY March 31, 1959 W. G. GORTON 2,879,737
DEPTH-CONTROLLING DEVICES FOR OBJECTS TOWED IN WATER
Filed Jan. 18, 1956 3 Sheets-Sheet 2
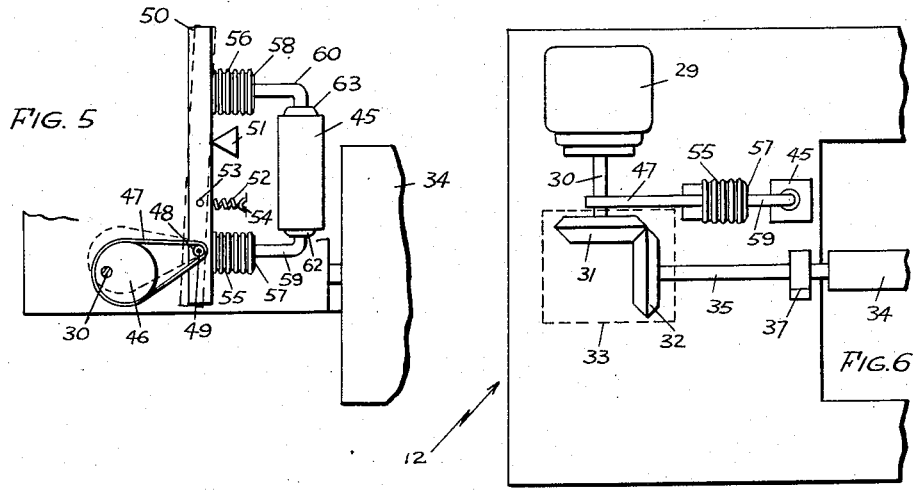
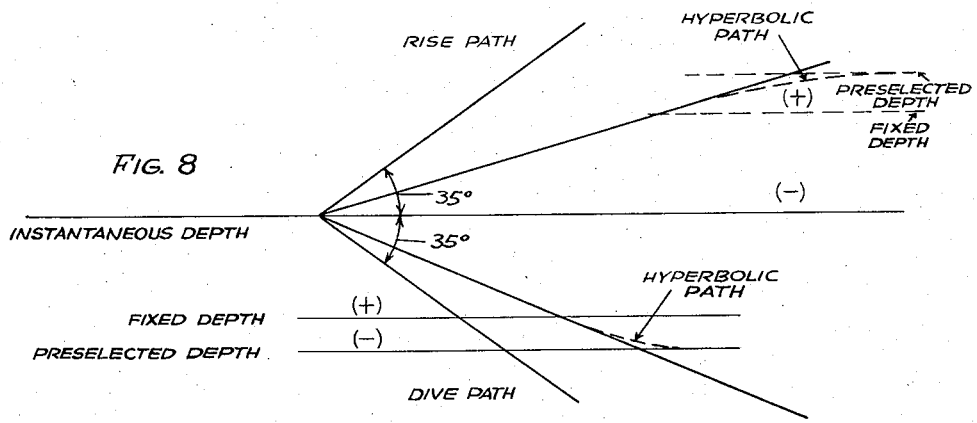
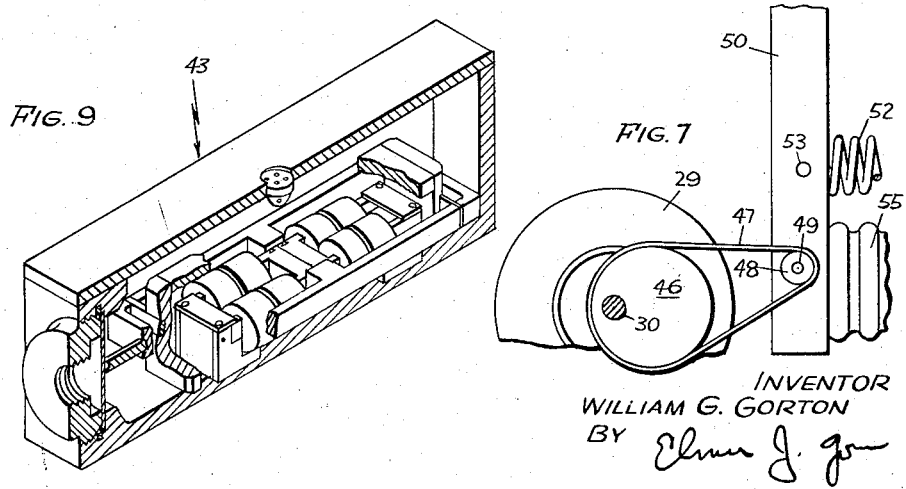
INVENTOR
WILLIAM G. GORTON
BY
ATTORNEY INVENTOR
WILLIAM G. GORTON
BY Elmer J. Gorm
ATTORNEY

United States Patent Office 2,879,737
Patented Mar. 31, 1959

2,879,737

DEPTH-CONTROLLING DEVICES FOR OBJECTS TOWED IN WATER

William G. Gorton, Belmont, Mass., assignor to Raytheon Manufacturing Company, Waltham, Mass., a corporation of Delaware Application January 18, 1956, Serial No. 559,821

7 Claims. (Cl. 114—235)

This invention relates to underwater depth-controlling devices and particularly to a device designed to control the towed path of a device, such as a trawling device towed by a vessel, to a desired depth.

The invention is adaptable to various types of vessels, surface and underwater, wherein there is a desire to control the depth and the towed path of the towed device to said desired depth. One application of the invention is to commercial fishing wherein the towed device is a trawl, or net.

Within the last several years, commercial fishing vessels have been equipped with many kinds of apparatus to improve the quantity of the "catch." Some of the important apparatus adapted to commercial fishing are sonic devices for disclosing large bodies of fish, depth-indicating device for ascertaining the depth of the trawl in order to tactically maneuver the trawl to engulf the disclosed body of fish, and more recently, depth-controlling devices for automatically preselecting the depth of the trawl to substantially coincide with the disclosed depth of the body of fish. All of these devices have assisted in improving the quantity of the "catch," but each is necessarily subject to limitations when used alone or in combination with each other. The most basic combination of the aforementioned devices includes the depth-sounding and depth-indicating devices. The greatest limitation of this system is that it requires well-coordinated activities by personnel to maneuver the trawl to the desired depth in time to engulf the disclosed body of fish. Naturally, any error in the position of the trawl will decrease the quantity of the "catch" and the operation requires the coordinated activity of several men. This limitation has been overcome to some extent by the system comprising depth-sounding and depth-controlling devices, but the limitation of this type of system, at the present state of the art, may at times be as great as that inherent in the previously mentioned basic system. Briefly, the present devices for automatically preselecting the towed depth of the trawl in accordance with the disclosed depth of the body of fish comprise preselecting means carried on the vessel and means responsive to said preselecting means attached to modified otterboards, which are in turn attached to the mouth of the trawl. Two modified otterboards, each having a movable planing member, are usually employed. The planing members are positioned by the means responsive to the preselecting means at some angle initially that is compatible with the preselected depth. Some adaptation of a depth-indicating device is often utilized to decrease the attack angle of the planing member as the otterboard, and hence, the trawl approaches the preselected depth. Any time the trawl veers from the preselected depth the angle of attack changes to return the otterboard to the preselected depth. The most objectionable limitation of this type of device is that the towed trawl tends to hunt or oscillate about the preselected depth. This objectionable feature is due to the fact that deviations from the preselected depth are corrected by a servo device which is responsive to error signals developed as a function of the change in water pressure at depths prior to or beyond the preselected depth. Since the trawl and the depth-controlling device are towed, small deviations of the attack angle of the planing members result in large changes in depth. The conventional servo device responds to changes in water pressure about the preselected depth by varying the attack angle of the planing members. However, this corrective action necessarily lags the instantaneous depth of the trawl and hunting about the preselected depth is inherent in the operation of the device.

In the present invention, hunting about the preselected depth is substantially eliminated. This is accomplished by the use of servo devices responsive to two separate error signals developed prior to the preselected depth. Briefly, the device functions as follows. An additional feature is incorporated into the device, whereby the path of the towed trawl, in addition to the depth, is preselected. The preselection of the path positions the attack angle of the planing members. Error signals are developed throughout the dive or rise toward the preselected depth whenever the attack angle is other than that required for the preselected path. At substantially a fixed depth prior to, but close to the preselected depth, error signals are developed which are a function of the water pressure between the fixed depth and the preselected depth. These error signals have sense opposite to the error signals developed to maintain the attack angle of the preselected path. Therefore, at substantially the fixed depth the servo device reverses its direction of rotation and the attack angle of the planing member functions like a brake on the final movement of the trawl. The lag of the response of the servo device in this system will not result in overshoot of the preselected depth as the attack angle is already oppositely positioned to that which was initially selected, and the otterboards approach the preselected depth substantially hyperbolically, or at a decreasing rate.

The foregoing and other objects of my invention will best be understood from the following description of exemplifications thereof, reference being had to the accompanying drawings, wherein:

Fig. 1 is an isometric view of the present invention adapted to a surface vessel towing a trawl;

Fig. 2 is an elevation view of the side of an otterboard whereon underwater components are mounted;

Fig. 3 is a plan view of a position-responsive transducer with its cover removed taken along the line 3—3 in Fig. 4;

Fig. 4 is a transverse sectional view of a position-responsive transducer taken along the line 4—4 in Fig. 3;

Fig. 5 is a detailed view of a portion of Fig. 2 showing the arrangement of a motor and components energized thereby;

Fig. 6 is a detailed view of a portion of Fig. 2 showing the arrangement of gearing energized by a motor;

Fig. 7 is a detailed view of a portion of Fig. 5 showing the arrangement of components for energizing a bellows;

Fig. 8 is a diagram showing possible dive and rise paths to a preselected depth;

Fig. 9 is an isometric view of a pressure-responsive transducer; and

Figure 10:
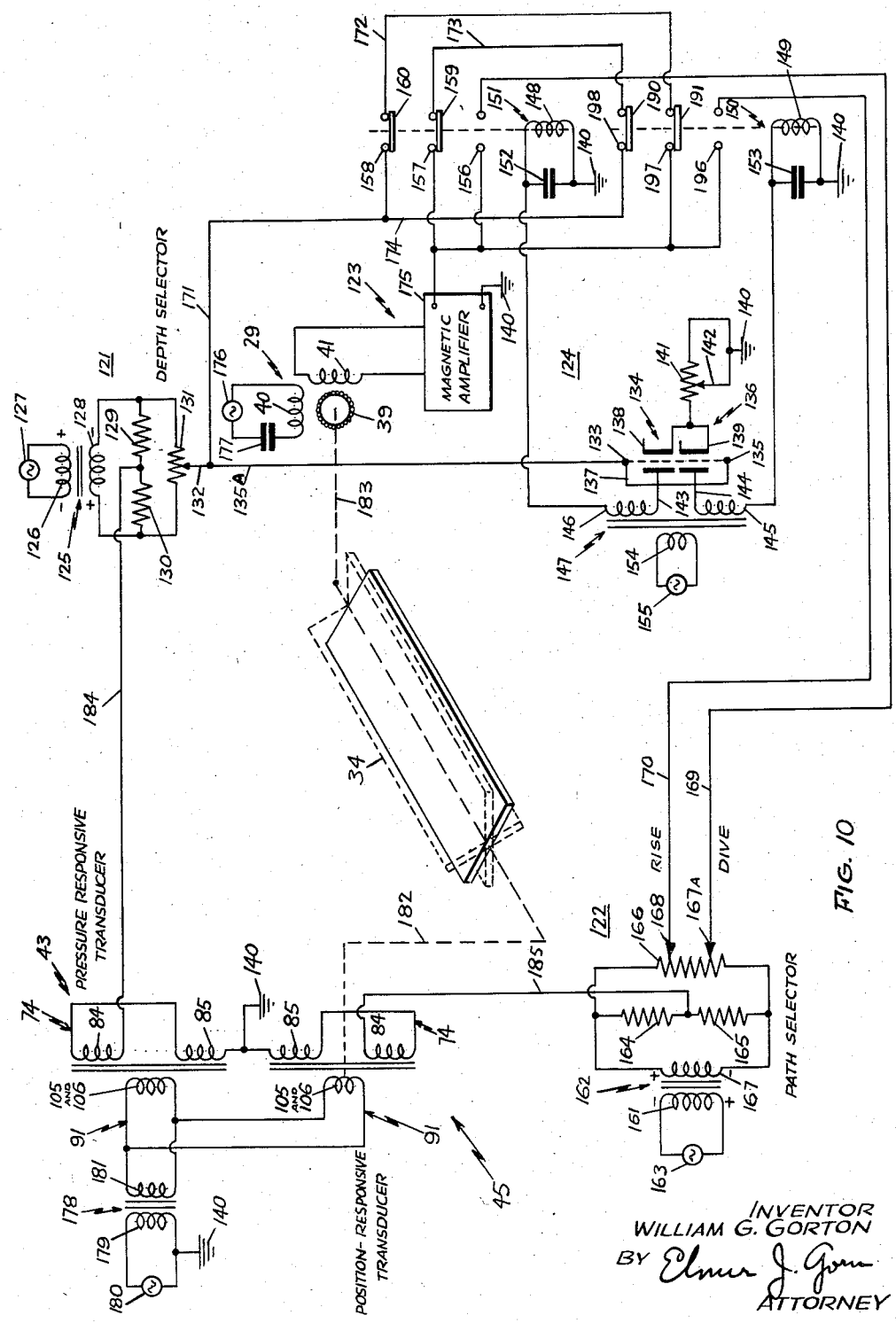
Fig. 10 is a schematic diagram of electrical components.

In Fig. 1, the depth-controlling device is shown in its adaptation to a fishing vessel 10 towing a trawl 11. Two modified otterboards 12 and 13 are attached to opposite ends of the mouth of the trawl. Since both otterboards are physically identical and have identical components mounted thereon which are energized in the same manner by the vessel-borne components 14, the subsequent discussion will be concerned with the description and theory of operation of only one otterboard, but the description will be applicable to both.

In Fig. 2 the components of the otterboard 12 are detailed. The otterboard is attached at one side thereof to the trawl 11 by a pair of cables 15 secured separately in a pair of rings 16 imbedded in said otterboard. The otterboard is connected to a tow cable 17 by a metal chain 18 secured at both ends by a pair of rings 19 imbedded in the otterboard. The tow cable 17 may be specially constructed to include a waterproof cable 20 within its core, or said cable may be secured to the tow cable. The cable 20 electrically interconnects components mounted on the otterboards with the vessel-borne components 14. The cable 20 is fastened to the surface of the otterboard by several clips 21 and its waterproof connector 22 mates with a waterproof connector 23 of a junction box 24. The junction box 24 is waterproof to prevent short circuiting of signals due to the conductivity of salt water. Three other waterproof connectors 25, 26 and 27 are also a part of the junction box.

A waterproof cable 28, between connector 25 and a two-phase motor 29, carries electrical signals for energizing the motor. When the motor 29 is energized, a shaft 30 energizes a pair of bevel gears 31 and 32, enclosed in a gear box 33. (See Fig. 6.) The bevel gear 31 is attached to the shaft 30. Referring again to Fig. 2, a diving plane 34 may be horizontally supported in a plane parallel to a vertical surface of the otterboard by shafts 35 and 36 extending from the sides of the diving plane. The shafts 35 and 36 are secured in stainless steel ball-bearing housings 37 and 38. The otterboard 12 may have an opening 39 in its surface so that the diving plane 34 can extend horizontally through said opening.

As shown in Fig. 6, the bevel gear 32 is attached to the shaft 35 and meshes with the bevel gear 31. When the motor 29 is energized in one direction, the diving plane 34 tilts so as to cause the otterboard to dive downward. Conversely, when the motor rotates in the opposite direction, the diving plane tilts so as to cause the otterboards to rise. The dive and rise of the otterboards is described more fully in the discussion of the theory of operation.

Metal components comprising the motor 29, the shaft 30, the bevel gears 31 and 32, the gear box 33, the shafts 35 and 36, and ball-bearing housings 37 and 38 may be fabricated from metals resistant to salt-water corrosion to prolong the usefulness of the components in salt-water medium. Similarly, by using salt-water resistant metals for the housing and for the ball-bearings 39, and by impregnating the fixed-phase winding 40 and the variable-phase winding 41 of the motor 29 with salt-water resistant plastic, the inner structure of the motor will not have to be maintained watertight.

Referring again to Fig. 2, a waterproof cable 42, between connector 26 of the junction box 24 and a pressure-responsive transducer 43, carries electrical energy to energize components and to couple energy generated as a function of the depth of the otterboard to the vessel-borne components 14. A waterproof cable 44, between the connector 27 of the junction box 24 and a position-responsive transducer 45, also carries electrical energy to energize components and to couple energy generated as a function of the angle moved by the diving plane 34 to the vessel-borne components 14. The distance moved by the diving plane 34, in response to rotation of the shaft 30, is converted into electrical energy having direction and magnitude by the arrangement of the following components and the operation of the transducer. Refer to Figs. 5 and 7 and again to Fig. 6 for a more detailed view of the components actuated by the shaft 30. A cam 46 is eccentrically mounted on the shaft 30 to subsequently develop a voltage having sense and magnitude which is a function of the degree and direction of rotation of the gear. A strap 47 runs around the periphery of the cam 46 and is pulled taut around a rotatable spool 48. A shaft 49 attached to a crossbar 50 and extending horizontally therefrom supports the spool 48. The crossbar is balanced on a fulcrum 51, and a tension spring 52, connected between tie point 53 on the crossbar 50 and a second tie point 54, holds the crossbar on the fulcrum. Two bellows 55 and 56 are suitably placed near the crossbar 50 so that when the crossbar pivots about its fulcrum one bellows will be allowed to expand as the other is compressed. The ends of the bellows 55 and 56, furthest from the crossbar 50, are terminated by covers 57 and 58. The covers 57 and 58 have suitable conduits 59 and 60 extending therefrom for containing a liquid, such as oil, between each bellows and inputs 62 or 63 of the position-responsive transducer 45. The ends of the bellows nearest to the crossbar 50 are sealed after the bellows are suitably connected to the transducer 45, and each bellows and its associated conduit is filled with oil. It follows, then, that the pressure of the crossbar on the bellows 55 or 56 forces oil out of one side to an input of the position-responsive transducers 45, depending on the particular bellows acted upon. The pressure-responsive transducer 43 and the position-responsive transducer 45 are similarly constructed. A discussion of the more detailed arrangement of the position-responsive transducer follows and differences between the two transducers will be noted subsequently.

The position-responsive transducer is illustrated in Figs. 3 and 4. The elements comprising the units are contained in a waterproof housing 64, including side members 65, 66, 67 and 68. A watertight connector 69, having four terminals 70, 71, 72 and 73, may be conveniently secured in a cut out in any side member of the housing 64.

A discussion of the elements comprising components contained within the housing follows. Electrical connections to particular elements will be described after the structural analysis.

A fixed coil assembly 74 is secured inside the housing 64 by a pair of screws 75 attached to a mounting plate 76. Disposed opposite each other, near the ends of the mounting plate 76, and attached thereby by screws 77, are two platforms 78 and 79. Each platform is identical and may be fabricated from a non-corrosive metal suitably machined to form two staggered levels 80 and 81 for supporting a U-shaped laminated core 82 or 83 and a pair of coils 84 or 85. The platforms 78 and 79 are positioned at opposite ends of the mounting plate 76 with the staggered levels facing each other and the longest dimension of the bases secured to the mounting plate. The joining member of each core 82 or 83 is supported on the first levels 80 of each platform so that the open ends of the cores face one another. A clamp 86 or 87, secured by a pair of screws 88, holds a core 82 or 83 in place in each platform. The coil 84 or 85 is fitted snugly on each leg of the U-shaped core 82 or 83, and each can have a portion thereof supported on the second levels 81 of the platforms 78 and 79.

A frame 89 may be attached to the ends of the mounting plate 76 by screws 90 to provide means for supporting a movable coil assembly 91 in a horizontal plane around the fixed coil assembly 74. The outer surface of the vertical sides of the frame 89, attached to the mounting plate 76, are machined so that an area up to, but not including a small area substantially surrounding the center is chamfered. A resilient strip of non-corrosive metal 92 or 93 is secured substantially at the center of the outer surface of each vertical side, with its broadest dimension flush with the outer surface, by a pair of screws 94 or 95.

The movable coil assembly 91 is supported by the strips 92 and 93 around the frame 89 in the following manner. The vertical portions of each of the strips 92 and 93 are included within and secured by a pair of screws 95 or 96, which secure a yoke 97 or 98 to each end of a pair of side members 99 or 100 of the movable coil assembly. The lengths of the side members 99 and 100 are determined in part by a consideration of the physical construction of electrical parts, and by the desirable characteristics to be achieved by constructing such a transducer. At the center of each side member 99 or 100, a short horizontal segment 101 or 102 protrudes horizontally toward the opposite side member. Another pair of U-shaped laminated cores 103 and 104 are positioned back to back and secured to the segments 101 and 102 in substantially the same plane as the cores 82 or 83. The dove-tail joints shown in Fig. 3 may be used to secure the cores to the segments. A coil 105 or 106 is fitted snugly on each leg of the cores 103 and 104. When assembled, the open end of each core should face an opposing core, and a pair of air gaps 107 or 108 should separate each opposing leg of opposite cores. It is evident at this point that the length of the side members 100 and 101 is critical in order to have the cores 103 and 104 suitably positioned, and to adjust the size of the pairs of air gaps 107 and 108.

A driving pin 109 or 110 is attached substantially to the center of the outer surface of each yoke 97 or 98 and extends therefrom perpendicularly toward each side member of the housing 64. The free end of each driving pin is suitably grooved to hold a ball bearing 111 or 112.

The side members of the housing 64 are suitably circularly cut out and threaded to accept a threaded nozzle 113 or 114. The nozzles 113 and 114 correspond to the inputs 62 or 63 of the position-responsive transducer 45. Each nozzle has a threaded aperture 115 or 116 in its surface. The aperture 115 or 116 covers an area in a horizontal plane compatible with the plane in which the driving pin 109 or 110 lies. The nozzles 113 and 114 are suitably machined so that a suitable area is axailable for the operation of a diaphragm 117 or 118. A circular disc, fashioned from a non-corrosive resilient metal, may function as the diaphragm 117 or 118. A diaphragm, surrounded by a ring gasket 119 or 120, is positioned to ride on the ball bearing 111 or 112 secured in the grooved portion of the yoke 109 or 110 and is clamped against a side member when the nozzle is screwed in place in said side member.

Each diaphragm 117 or 118 is acted upon by the force of oil pressure contained in the conduit attached to each nozzle. As mentioned previously, the movement of the crossbar 50 about its fulcrum 51 increases the oil pressure in one conduit. Thus, a greater pressure is exerted on one diaphragm than the other. Since the movable coil assembly 91 is coupled to each diaphragm through the yokes 109 and 110 at the ends thereof, the movable coil assembly is displaced a distance proportional to the differential pressure exerted upon the diaphragms. Depending on the direction of movement, the size of one pair of air gaps 107 or 108 increases as the other pair decreases. The sense and magnitude of the output voltage developed by the position-responsive transducer 45 is dependent upon the direction in which the fixed coil assembly 74 is displaced. A reference to the theory of operation concerned with developing the output voltage is given in a subsequent paragraph.

The structure of the pressure-responsive transducer 43 is shown in Fig. 9. The difference embodied in this transducer are as follows. Only one nozzle 113 or 114 and its associated diaphragm 117 or 118 and gasket 119 or 120 is included. Likewise, only one yoke 109 or 110 is required to sense changes of pressure on the diaphragm 117 or 118 at the depth of the otterboard; and only one side member of the housing need be circularly cut and threaded.

The cable 20 couples signals between the underwater components previously mentioned and the vessel-borne components. Said vessel-borne components include dual means for controlling the otterboards 12 and 13. However, since each controlling means is identical and functions in the same manner, the structural analysis of one is given. Refer to Fig. 10 wherein an electrical schematic diagram is shown. Basically, the vessel-borne components include a means 121 for preselecting the depth of the otterboard 12, a means 122 for preselecting the dive path, and a means for preselecting the rise path of the otterboard included in one embodiment, a means 123 for energizing the motor 29 mounted on the otterboard, and a means 124 for switching the signals coupled to the means 123 energizing said motor.

The sense of the alternating currents employed between certain electrical components is significant, and the relationships mentioned are inherently a part of the principles required to have the system function as outlined. The means 121 for preselecting the depth of the otterboard comprises an iron-core transformer 125, having a primary winding 126 energized by an alternating current source 127 connected across the terminals thereof. A secondary winding 128 has two separate parallel branches across it including two resistors 129 and 130 in series, and a variable resistor 131. The wiper arm 132 of the variable resistor is coupled to a grid 133 of a section 134 of a duo-triode by a lead 135A. The grids 133 and 135 of the sections 134 and 136 of the duo-triode are connected together by a lead 137. A cathode 138 and 139 of each section is also tied together and connected to a common ground 140 through a variable resistor 141. The wiper arm 142 of the variable resistor is connected to the common ground 140 to provide a means for varying the sensitivity of the triode sections. An anode 143 and 144 of each section is connected to the common ground 140 through a series circuit consisting of a secondary winding 145 or 146 of an iron-core transformer 147 and a solenoid 148 or 149 of a relay 150 or 151. A capacitor 152 or 153 is connected to the common ground 140 across the solenoid 148 or 149. The points of connection of the anodes 143 or 144 to the secondary windings are 180 degrees out of phase with respect to each other. A primary winding 154 of the transformer 147 is connected to an alternating-current source 155. The relay 150 has three pairs of contacts 156, 157 and 158 and a pair of movable contactors 159 and 160. The relay 151, similarly, has three pairs of contacts 196, 197, and 198, and a pair of movable contactors 190 and 191.

The relay 151 is designated as the dive relay and the relay 150 is the rise relay. When the dive relay 151 is energized, contacts 157 and 158 are opened, and contact 156 is closed. Similarly, when the rise relay 150 is energized, contacts 197 and 198 are opened, and contact 196 is closed.

The means 122 for preselecting the dive path and the means for preselecting the rise path include primary winding 161 of an iron-core transformer 162 connected across an alternating-current source 163. The alternating current source 163 and the source 127 of the means for preselecting the depth are 180 degrees out of phase with respect to each other. Two parallel branches, including two resistors 164 and 165 in series in one branch and a variable resistor 166 in the second branch, are connected across a secondary winding 167. The variable resistor 166 has two wiper arms 167A and 168. A lead 169 couples the wiper arm 167A to one of the pair of contacts 156 of the dive relay 151. A lead 170 couples the wiper arm 168 to one of the pair of contacts 196 of the rise relay 150.

A lead 171 couples the wiper arm 132 of the means 121 to one of the pair of contacts 158 of the dive relay, A lead 172 couples the other one of the pair of contacts 158 of the dive relay to one of the pair of contacts 197 of the rise relay. A lead 173 couples one of the pair of contacts 157 of the dive relay to one of the pair of contacts 198 of the rise relay. A lead 174 couples the lead 171 connected to one of the pair of contacts 158 of the dive relay to one of the pair of contacts 198 of the rise relay. The remaining contacts of the pairs 156 and 157 of the dive relay and the pairs 196 and 197 of the rise relay are coupled to the input of the means 123 for energizing the motor 29.

The means 123 for energizing the motor may include a magnetic amplifier 175. The output of the magnetic amplifier is carried by the cable 20 to the junction box 24, and is coupled to the variable-phase winding 41 of the motor 29. The cable 20 also carries an alternating current from a source 176 to energize the fixed-phase winding 40 of the motor 29. A capacitor 177 may be included in series with one side of the fixed-phase winding to cause a phase shift which improves the response of the motor.

An iron-core transformer 178, having a primary winding 179 connected across an alternating-current source 180, may be employed to provide an output voltage across a secondary winding 181 for energizing the two pairs of coils 105 or 106 included in the movable coil assemblies 91 of the pressure- and position-responsive transducers 43 and 45. The pairs of coils 105 and 106 may be connected in series as shown in Fig. 10. The two pairs of coils 84 and 85 comprising the fixed coil assemblies 74 of the transducers 43 and 45 are connected in series opposing with respect to each other, one coil in each pair being connected in phase with the series-connected coils of the movable coil assembly and the other coil in each pair being connected 180 degrees out of phase with the coils of the movable coil assembly.

The coupling line 182 indicates that the movable coil assembly 91 of the position-responsive transducer 45 is responsive to movements of the diving plane 34. Movements of the diving plane are initiated by the motor 29 and the mechanical coupling is represented by coupling line 183.

The output of the pressure-responsive transducer 43 is coupled to the junction of the resistors 129 and 130 by the lead 184. Similarly, the output of the position-responsive transducer 45 is coupled to the junction of resistors 164 and 165 by the lead 185.

It seems worthwhile at this point to consider several hydrodynamic characters to clarify the present embodiment of the invention. Each otterboard functions to keep the mouth of the trawl open by providing a plane against which the force of water pressure can act while the vessel is in motion. Thus, if the vessel is visualized from the trawl while the vessel is in motion, the otterboards will be seen to diverge or flare.

The diving planes 34 control the hydrodynamic characteristics of the otterboards in much the same manner as a rudder controls the path of a surface vessel, even though the plane of movement is other than that employed in the present embodiment. The effectiveness of the diving planes in controlling the path of the otterboards through the water medium is most pronounced in the area of the otterboards acted upon by the force of water pressure, that is, the inner, opposing surfaces of the otterboards. Thus, for the purpose of describing the angular movement of the diving plane, downward or upward tilting refers to the position of the diving plane extending from the inner, opposing surfaces of the otterboards.

The system operates as follows. A depth at which it is desired to tow the trawl is preselected by the setting of wiper arm 132. Arbitrarily the phase relationship has been adjusted so that increasing depth corresponds to the negative sense of the alternating current across the secondary winding 128 of the transformer 125. Conversely, the positive sense corresponds to decreasing depth. A path for the trawl to the preselected depth may be selected by positioning the wiper arm 167A or 168. Assuming that the trawl has settled to some depth after being dropped overboard and it is desirable to have the trawl towed at a greater depth, a dive path is selected by positioning wiper arm 167A. It is contemplated to have the diving plane movable through approximately 35 degrees above and below its horizontal position. Once again and arbitrarily, the phase relationship has been adjusted so that an increasing dive angle corresponds to the negative sense of the alternating current across the secondary winding 167 of the transformer 162. The anode 143 of the section 134 is phased by the connection to the secondary winding 146 so that the anode has a positive sense when the wiper arm 132 has a positive sense, and thus, the grid 133 has a positive sense. This relationship exists every half cycle and the section 134 conducts sufficient current to energize the dive relay 151. When the pair of contacts 156 close, the dive-path signal is coupled to the magnetic amplifier 175. However, as mentioned previously, the source 127 for the means 121 for preselecting the depth and the source 163 for the means 122 for preselecting the dive path are 180 degrees out of phase with respect to each other. Therefore, whenever the section 134 conducts, a signal with negative sense is fed to the magnetic amplifier.

The magnetic amplifier develops an alternating current having a sense that causes the motor to rotate in a direction that tilts the diving plane 34 downward through an angle compatible with the preselected path. The capacitor 152 maintains a constant potential across the solenoid 148 during each half cycle that the section 134 conducts.

The position-responsive transducer 45 provides an alternating-current signal, having a sense and magnitude proportional to the instantaneous position of the diving plane 34. The embodiment of the transducer 45 is constructed to enable a voltage to be developed which is independent of the temperature and pressure of the environment. Thus, two nozzles are employed and the output voltage is a function of the differential pressure acting upon the movable coil assembly 91. The principles of operation of the transducer 45 are described in Patent No. 2,470,244.

The output of the position-responsive transducer 45 is coupled to the junction of the resistors 164 and 165. The output is phased so that it is 180 degrees out of phase with the dive-path signal. Thus, at the wiper arm 167A there will be an error signal proportional to the deviation of the diving plane 34 from its preselected position. When the diving plane is at the preselected position for the preselected dive-path, the error signal is zero.

The otterboards are towed along the preselected path until substantially at a fixed depth prior to the preselected depth. Substantially at the fixed depth, any dive-path error signal present is disconnected from the input to the magnetic amplifier 175 in the following manner.

An error signal is also developed at the wiper arm 132 of the means 121 for preselecting the depth of the trawl. This error signal is developed in substantially the same manner as that described for the means 122 for preselecting the dive path. The pressure-responsive transducer 43 develops an alternating current that has sense and magnitude as a function of the depth of the otterboard. Similarly the theory of operation is described in the aforereferenced Patent No. 2,470,244. The output of the transducer 43 is coupled to the junction of the resistors 129 and 130 and is phased to be 180 degrees out of phase with the negative sense assigned to increasing depth. Thus, the error signal at the wiper arm 132 is decreasing to zero as the otterboards approach the preselected depth.

The operating characteristics of the section 134 have been selected so that the tube will not conduct a sufficient current to energize the relay 151 when the error signal at the grid is substantially one volt. The system may be designed so that one volt corresponds to approximately five feet, said depth being the fixed depth prior to the preselected depth. When the dive relay becomes de-energized, the position-error signal to the magnetic amplifier 175 is removed by the opening of the pair of contacts 156 and the depth-error signal is fed to the magnetic amplifier via the contacts 158 of the dive relay and contacts 197 of the rise relay. The depth-error signal is 180 degrees out of phase with the dive-path signal that positioned the diving plane. Thus, the diving plane moves in a direction to decrease the angle at which it was positioned for the dive path. The change of position of the diving plane causes the otterboard to approach the preselected depth substantially hyperbolically, or at a decreasing rate. The tendency to overshoot the preselected depth is practically eliminated, but should overshoot occur, and it is expected in a turbulent medium such as that encountered in commercial fishing operations, the system immediately corrects itself. Incidentally, the operation of the system for overshoot is a portion of the operation of the system for a rise in the depth of the otterboard. At depths beyond the preselected depth, but prior to the fixed depth thereafter, the depth-error signal is in phase with the position-error signal that initially positioned the angle of the diving plane. Thus, the diving plane is once again tilted downward for diving to the preselected depth. In addition, as previously mentioned in regard to the novelty of the present invention, overshoot and subsequent oscillation or hunting about the preselected depth is eliminated by virtue of the reversed position of the diving plane at depths between the fixed depth and the preselected depth. The pattern for the rise path is simply the opposite of that for the dive path within the same kind of limits fixed in the dive path. The depth-error signal causes the section 136 of the duo-triode to conduct and the rise relay 150 is energized on alternate half cycles until substantially the fixed depth is reached. Prior to the fixed depth, the rise signal causes the diving plane to be tilted upward. Substantially at the fixed depth the depth-error signal reverses the position of the diving plane so that the otterboards approach the preselected depth substantially hyperbolically, or at a decreasing rate.

In the adaptation to commercial fishing, as described herein, the advantages of the present invention also enable a smaller, and therefore more easily maneuverable trawl to be employed. In addition, fewer personnel will be required to attend to the operation of maneuvering the trawl. Above all, the quantity of the "catch" will greatly improve.

The invention is not limited to the particular details of construction, materials used, or to the particular embodiment of the pressure- and position-responsive transducers described herein, as many equivalents will suggest themselves to those skilled in the art. It is desired that the claims that follow be given broad interpretation commensurate with the scope of the invention within the art.

What is claimed is:

1. A depth-controlling device comprising a body adapted to be attached to a device towed by a vessel; depth-varying means on said body for varying the towed path of said body toward a predetermined depth; selecting means adapted to be carried on the vessel including a first means for preselecting a path for said body and a second means for preselecting a depth to which said body will change its position; means responsive to said path-selecting means to guide said body along said preselected path; and means responsive to said depth-selecting means at substantially a fixed depth prior to said preselected depth for altering the position of said depth-varying means in a manner to cause said body to approach said preselected depth at a decreasing rate.

2. A depth-controlling device comprising a body adapted to be attached to a device towed by a vessel; depth-varying means on said body for varying the towed path of said body toward a predetermined depth; controlling means adapted to be carried on the vessel for controlling the position of said depth-varying means; means for connecting said controlling means to said depth-varying means; selecting means adapted to be carried on the vessel including a first means for preselecting a path for said body and a second means for preselecting a depth to which said body will change its position; means responsive to said path-selecting means before said body reaches a fixed depth prior to said preselected depth and adapted to energize said controlling means for positioning said depth-varying means to have said body follow said preselected path; and means responsive to said path-selecting means at substantially said fixed depth and until said preselected depth and adapted to energize said controlling means for altering the position of said depth-varying means in a manner to cause said body to approach said preselected depth at a decreasing rate.

3. A depth-controlling device comprising a body adapted to be attached to a device towed by a vessel; depth-varying means on said body for varying the towed path of said body toward a predetermined depth; sensing means on said body for sensing the depth of said body; selecting means adapted to be carried on the vessel for preselecting a depth to which said body will change its position; means for coupling said depth-sensing means to said depth-selecting means to develop error-signals before said body reaches said preselected depth; and means responsive to said selecting means for causing said depth-varying means to guide said body substantially along a predetermined path until a fixed depth before said preselected depth and responsive to said depth-error signals at substantially said fixed depth and until said preselected depth for altering the position of said depth-varying means in a manner to cause said body to approach said preselected depth at a decreasing rate.

4. A depth-controlling device comprising a body adapted to be attached to a device towed by a vessel; depth-varying means on said body for varying the towed path of said body toward a predetermined depth; selecting means adapted to be carried on the vessel including a first means for preselecting a path for said body and a second means for preselecting a depth to which said body will change its position; means responsive to said path-selecting means for positioning said depth-varying means for said preselected path; sensing means on said body for sensing the position of said depth-varying means; means for coupling said position-sensing means to said path-selecting means to develop error signals to maintain said depth-varying means positioned for said preselected path; and means responsive to said depth-selecting means for altering the position of said depth-varying means at substantially a fixed depth prior to said preselected depth and until said preselected depth in a manner to cause said body to approach said preselected depth at a decreasing rate.

5. A depth-controlling device comprising a body adapted to be attached to a device towed by a vessel; depth-varying means on said body for varying the towed path of said body toward a predetermined depth; controlling means adapted to be carried on a vessel for controlling said depth-varying means; means for connecting said controlling means to said depth-varying means; means on said body for sensing the position of said depth-varying means; selecting means adapted to be carried on the vessel including a first means for preselecting the drive path of said body, a second means for preselecting the rise path of said body, and a third means for preselecting the depth of said body; means on said body for sensing the depth of said body; means for coupling said position-sensing means to each of said path-selecting means for developing error signals to maintain said depth-varying means positioned for one of said preselected paths; means for coupling said depth-sensing means to said depth-selecting means for developing error signals before said body reaches said preselected depth; said error signals having sense opposite to the sense positioning said depth-varying means for one of said preselected paths; means for coupling said dive and rise error signals to said controlling means; means for coupling said depth-error signals to said controlling means; said controlling means including a first means responsive to said depth-error signals before said body reaches a fixed depth prior to said preselected depth, and a second means, connected to and adapted to be responsive to said first named means for energizing said depth-varying means with said error signals for positioning said depth-varying means for one of said preselected paths, and adapted to energize said depth-varying means with said oppositely sensed depth-error signals at substantially said fixed depth and until said body attains said preselected depth whereby said depth-varying means returns toward its normal position and said body approaches said preselected depth substantially hyperbolically.

6. A depth-controlling device comprising an otterboard adapted to be attached to a device towed by a vessel; depth-varying means on said otterboard including a diving plane horizontally supported in a plane substantially parallel to a vertical surface of said otterboard and adapted to tilt about said supporting plane for varying the towed path of said body toward a predetermined depth; selecting means adapted to be carried on the vessel for preselecting a depth to which said otterboard will change its position; and means responsive to said selecting means for positioning said diving plane to guide said otterboard substantially along a preselected path until a fixed depth before said preselected depth and for altering the position of said diving plane at substantially said fixed depth in a manner to cause said body to approach said preselected depth at a decreasing rate.

7. A depth-controlling device comprising a body adapted to be attached to a device towed by a vessel; depth-varying means on said body for varying the towed path of said body toward a predetermined depth; selecting means adapted to be carried on the vessel including a first means for preselecting a path for said body and a second means for preselecting a depth to which said body will change its position; controlling means adapted to be carried on the vessel including a first means responsive to said path-selecting means before said body reaches a fixed depth before said preselected depth and adapted to energize said depth-varying means in a manner to have said body follow said preselected path, a second means responsive to said depth-selecting means at substantially said fixed depth and until said preselected depth and adapted to energize said depth-varying means in a manner to cause said body to approach said preselected depth at a decreasing rate.

References Cited in the file of this patent

UNITED STATES PATENTS

| 1,557,728 | Robert | Oct. 20, 1925 |
| 2,470,244 | Fryklund | May 17, 1949 |
| 2,581,359 | Clark | Jan. 8, 1952 |
| 2,641,742 | Wolfe et al. | June 9, 1953 |
| 2,679,227 | Symonds | May 25, 1954 |
| 2,689,425 | De Veen | Sept. 21, 1954 |
| 2,729,910 | Fryklund | Jan. 10, 1956 |